(12) United States Patent
Aumann et al.

(10) Patent No.: US 9,306,818 B2
(45) Date of Patent: Apr. 5, 2016

(54) METHOD FOR CALCULATING STATISTIC DATA OF TRAFFIC FLOWS IN DATA NETWORK AND PROBE THEREOF

(71) Applicant: CELLOS SOFTWARE LTD, Melbourne (AU)

(72) Inventors: Greg Aumann, Mitcham (AU); David Lynes, Blackburn South (AU); Amit Goel, Gurgaon (IN)

(73) Assignee: CellOS Software LTD, Melbourne (AU)

( * ) Notice: Subject to any disclaimer, the term of this patent is extended or adjusted under 35 U.S.C. 154(b) by 77 days.

(21) Appl. No.: 14/334,299

(22) Filed: Jul. 17, 2014

(65) Prior Publication Data

US 2016/0020968 A1    Jan. 21, 2016

(51) Int. Cl.
*H04L 12/26* (2006.01)
*H04L 12/861* (2013.01)
*H04L 12/801* (2013.01)

(52) U.S. Cl.
CPC .......... *H04L 43/062* (2013.01); *H04L 43/0888* (2013.01); *H04L 47/12* (2013.01); *H04L 49/90* (2013.01)

(58) Field of Classification Search
None
See application file for complete search history.

(56) References Cited

U.S. PATENT DOCUMENTS

| | | | | |
|---|---|---|---|---|
| 5,986,589 A * | 11/1999 | Rosefield | ......... | G11B 20/10527 341/61 |
| 6,853,619 B1 * | 2/2005 | Grenot | ......... | H04L 43/022 370/232 |
| 2003/0145231 A1 * | 7/2003 | Poletto | ......... | H04L 63/1408 726/22 |
| 2003/0225549 A1 * | 12/2003 | Shay | ......... | H04L 41/5009 702/182 |
| 2004/0010718 A1 * | 1/2004 | Porras | ......... | H04L 12/2602 726/23 |
| 2010/0185760 A1 * | 7/2010 | Nakahira | ......... | H04L 41/142 709/224 |
| 2010/0322085 A1 * | 12/2010 | Kalbag | ......... | H04L 12/2697 370/249 |
| 2011/0125915 A1 * | 5/2011 | Takei | ......... | H04L 12/6418 709/230 |
| 2012/0047297 A1 * | 2/2012 | Bulgin | ......... | G06F 5/14 710/56 |
| 2015/0036513 A1 * | 2/2015 | Bukin | ......... | H04L 43/0888 370/250 |

\* cited by examiner

*Primary Examiner* — Ian N Moore
*Assistant Examiner* — Phong La
(74) *Attorney, Agent, or Firm* — Duane Morris LLP

(57) ABSTRACT

The disclosure provides a probe and a method for calculating statistic data of traffic flows. The probe comprises at least one link processor (LP) and a correlation processor (CP). Each LP includes two buffers, receives packets from directional traffic flows, generates information of bi-directional traffic flows based on the received packets, stores the generated information in one buffer within a reporting period and, reports the stored information to CP when the reporting period boundary is reached. The information of each bi-directional traffic flow includes the relevant identification information and statistic data. The CP calculates statistic data of a particular group of traffic flows with a predetermined characteristic based on the reported information, and the other buffer stores information of bi-directional traffic flows to be generated within a next reporting period and the stored information is to be reported to the correlation processor when the next reporting period boundary is reached.

15 Claims, 9 Drawing Sheets

METHOD FOR CALCULATING STATISTIC DATA OF TRAFFIC FLOWS IN DATA NETWORK AND PROBE THEREOF

FIELD OF INVENTION

The disclosure is directed in general to continuously monitor and sniff large amount of data packets from high speed traffic flows in a data network; and more particularly to effectively calculating statistic data of traffic flows by extracting some predetermined information from every data packet from high speed traffic flows in a data network.

BACKGROUND

Currently, solution providers have proposed to deploy Network Performance Monitor devices to sniff packets on traffic flows of a data network and perform analysis based on sniffed packets. In existing proposals, the Network Performance Monitor device (NPM) usually has the following functions:
1) receiving packets from directional traffic flows through linking to high-speed transmission links in a data network;
2) performing statistic data calculations on received packets of traffic flows;
3) reporting calculated statistic data to a Customer Experience Management (CEM) system in a Core Network/data network.

However, there are some major problems in these proposals which are explained as follows.

Firstly, the typical high speed data transmission rate in a normal data network may be up to 10 Gbps or even 40 Gbps. Therefore, it is required for the NPM device to have equivalent level of fast processing on incoming traffic flows. Specifically, the NPM device is required to extract information from the packets of the traffic flows quickly and perform quick mathematical operation on the packets. However, the present processing power of the NPM device is much limited compared to the high speed data transmission rate.

Furthermore, the operator of the core network is interested in metrics of Active Traffic flows such as Peak Bit Rate and Average Active Bit Rate for every customer. In order to obtain these metrics, the CEM system in the data network requires real-time traffic flow analysis for a customer. Thus, every period for reporting the calculated statistic data to the CEM system should be short enough, which is usually set at one minute. However, it has been observed that even only within one minute, the NPM device may receive thousands and even millions of packets and the number of the received packets for a specific customer or a particular application protocol within one reporting period may be constantly changed.

It would therefore be desirable to provide a method and apparatus for effectively obtaining correct and accurate metrics of high speed traffic flows in a data network.

SUMMARY OF INVENTION

Embodiments of the disclosure provide a probe which comprises at least one link processor and a correlation processor connected thereto. Each of the at least one link processor includes two buffers, and each link processor receives a plurality of packets from a plurality of directional traffic flows, generate information of a plurality of bi-directional traffic flows based on the received packets, stores the generated information in one of the two buffers within a reporting period, and reports the information stored in the one of the two buffers to the correlation processor when the reporting period boundary is reached. The information of each of the bi-directional traffic flows includes identification information extracted from received packets related to each of the bi-directional traffic flows, and statistic data accumulated based on the received packets related to the each of the bi-directional traffic flows. The correlation processor calculates statistic data of a particular group of traffic flows associated with a predetermined characteristic, based on the reported information of bi-directional traffic flows corresponding to the particular group of traffic flows, and the other of the two buffers stores information of bi-directional traffic flows which is to be generated within a next reporting period and reports the stored information in the other of the two buffers to the correlation processor when the next reporting period boundary is reached.

The probe in the disclosure is capable of generating information of bi-directional traffic flows based on the packets received from the directional traffic flows to calculate statistic data of a particular group of traffic flows associated with a predetermined characteristic. At the same time, in order to prevent time variations for reporting/transferring data from the link processor to a correlation processor, two alternately-serving buffers are utilised in each link processor.

Since incoming traffic flows in a data network are very fast and the present processing power of any computing electronics may be much limited compared to the transmission speed of a data network, the probe may include more than one link processor connected to the correlation processor. When the probe includes more than one link processor, all of the link processors are configured to synchronize boundaries of each reporting period.

In one embodiment of the disclosure, each link processor comprises a processor unit; a storage unit comprising the two buffers, wherein the storage unit is connected to the processor unit; at least one input network interface, connected to a data network and the processor unit; and an output interface, connected to the processor unit and the correlation processor, wherein the processor unit receives the packets through the at least one input network interface, extracts the identification information from the received packets related to each bi-directional traffic flow, accumulates statistic data based on the received packets related to the each of the bi-directional traffic flows to generate information of the bi-directional traffic flows based on the received packets, and stores the generated information in the one of the two buffers and reports the stored information in the one of the two buffers to the correlation processor through the output interface when the reporting period boundary is reached, and wherein the processor unit further stores information of bi-directional traffic flows which is to be generated in the next reporting period in the other of the two buffers and reports the stored information in the other of the two buffers to the correlation processor through the output interface when the next reporting period boundary is reached.

The correlation processor comprises: an input interface, connected to the at least one link processor; a processor unit, connected to the input interface; a storage unit, connected to the processor unit; and an output interface, connected to the processor unit, wherein the processor unit receives the reported information of bi-directional traffic flows from the at least one link processor through the input interface, calculates statistic data of the particular group of traffic flows associated with the predetermined characteristic, based on the reported information of bi-directional traffic flows corresponding to the particular group of traffic flows, and reports the calculated statistic data to a Customer Experience Management system which is external to the probe.

In order to obtain a more accurate statistic data, in one embodiment of the disclosure, the reporting period is divided into a plurality of sampling periods, and each of the at least one link processor reports the generated information for the each of the bi-directional traffic flows in a preconfigured data structure to the correlation processor. Wherein each data structure for each bi-directional traffic flow comprises:

two first vectors, which respectively accumulate the number of bytes in the received packets or the number of received packets of two directional traffic flows corresponding to each bi-directional traffic flow within the reporting period, wherein each of the first vectors has a plurality of elements, each element accumulates the number of bytes in the received packets or the number of received packets of the corresponding directional traffic flow within a sampling period, and two second vectors, which respectively record the active seconds of the two directional traffic flows corresponding to each bi-directional traffic flow within the reporting period, wherein each of the second vectors has a plurality of elements, each element records active seconds of the corresponding directional traffic flow within a predetermined sub-sampling period.

According to embodiments of the disclosure, the particular group of traffic flows may be selected from the group consisting of: all traffic flows for a particular subscriber associated with a predetermined subscriber identifier, all traffic flows for a particular application protocol associated with a predetermined application identifier, all traffic flows for a particular website associated with a predetermined domain name, and all traffic flows for a particular application protocol type associated with a predetermined application identifier and for a particular subscriber with a predetermined subscriber identifier.

In addition, according to an embodiment of the disclosure, each of the at least one link processor may further extract a sequence number from each of the received packets related to the bi-directional traffic flows to determine whether there is an out of sequence packet, missing packet and/or duplication packet.

The embodiments of the disclosure also provide a method for calculating statistic data of traffic flows in a data network, the method comprises the following steps:

receiving a plurality of packets from a plurality of directional traffic flows in the data network through at least one link processor of a probe;

within a reporting period, in each of the at least one link processor having two buffers, generating information of a plurality of bi-directional traffic flows based on the received packets within the reporting period and storing the generated information in one of the two buffers, reporting the information of bi-directional traffic flows stored in the one of the two buffers to a correlation processor of the probe when the reporting period boundary is reached, wherein the information of each of the bi-directional traffic flows includes identification information extracted from received packets related to each of bi-directional traffic flows and statistic data accumulated based on the received packets related to each bi-directional traffic flow;

in the correlation processor, calculating statistic data of a particular group of traffic flows associated with a predetermined characteristic, based on the generated information reported by the at least one link processor; and within a next reporting period, in each of the at least one link processor, generating information of bi-directional traffic flows based on the received packets within the next reporting period and storing the generated information in the other of the two buffers, reporting the information stored in the other of the two buffers to the correlation processor when the next reporting period boundary is reached.

In one embodiment of the disclosure, the calculating statistic data of a particular group of traffic flows associated with a predetermined characteristic comprises:

identifying the reported data structures of the bi-directional traffic flows related to a particular group of traffic flow based on the predetermined characteristic of the particular group of traffic flow;

applying logical OR on each element of all second vectors of the identified reported data structures to obtain a total number of active seconds of the particular group of traffic flows within the reporting period; and summing up the number of bytes in each element of all the first vectors of the identified reported data structures to obtain a total number of bytes in the received packets related to the particular group of traffic flows within the reporting period;

dividing the total number of bytes in the received packets by the total number of active seconds to obtain the Average Active Bit Rate of the reporting period of the particular group of traffic flows.

In another embodiment of the disclosure, the calculating statistic data of a particular group of traffic flows with a predetermined characteristic comprises:

identifying the reported data structures of bi-directional traffic flows related to the particular group of traffic flow based on the predetermined characteristic of the particular group of traffic flow;

applying logical OR on each element of all of the second vectors of the identified data structures to obtain the number of active seconds of the particular group of traffic flows within each sub-sampling period;

calculating a total number of active seconds in each sampling period based on the number of active seconds within each sub-sampling period;

summing up the number of bytes in each element of all first vectors of the identified data structures to obtain a total number of bytes in the received packets related to the particular group of traffic flows within each sampling period;

dividing the total number of bytes in the received packets in each sampling period by the total number of active seconds in each sampling period to obtain a Bit Rate of the particular group of traffic flows in each sampling period; and comparing the Bit Rate in each sampling period to obtain a Peak Bit Rate of the particular group of traffic flows.

BRIEF DESCRIPTION OF THE DRAWINGS

FIG. 4 (*c*) shows the processes executed by each Link Processor (LP) in a Probe for every reporting period according to the first embodiment of the disclosure.

DETAILED DESCRIPTION OF EMBODIMENTS OF THE INVENTION

Figure 1:
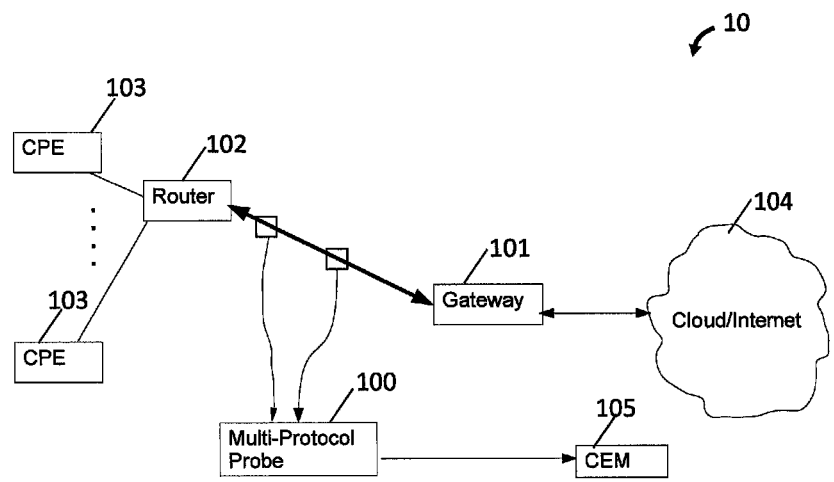
FIG. 1 illustrates the architecture of an exemplary data network according to one embodiment of the disclosure.

In the following description, numerous specific details are set forth in order to provide a thorough understanding of various illustrative embodiments of the disclosure. It will be understood, however, to one skilled in the art, that embodiments of the disclosure may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

FIG. 1 illustrates the architecture of an exemplary data network 10 according to one embodiment of the disclosure. Referring to FIG. 1, a Multi-Protocol Probe 100 (thereafter referred to Probe 100) connects to a link between a gateway 101 and an internal router 102 further connecting to a plurality of customer premise equipments (CPEs) 103 in the data network 10. For the simplicity of illustration, only the CPEs 103 are shown in FIG. 1, and there may be multiple computing devices connecting to the data network 10 through corresponding CPE 103. Each CPE 103 is assigned at least one IP address. For small business and home business, a single IP address, whether static or dynamic, may be assigned to each CPE 103. For large business, each CPE 103 may further connect to a cloud 104 contains a plurality of servers, so each CPE 103 may be assigned a range of IP addresses, which may be referred to as Aggregated IP addresses.

The Probe 100 transparently receives packets from a plurality of traffic flows directly associated with each CPE 103. It is noted that the Probe 100 merely extracts copies of packets from traffic flows in the data network 10, transparently processes the received packets and does not affect transmission of the packets in the data network 10. The Probe 100 is further configured to generate statistic reports based on the received packets and send the generated reports to the Customer Experience Management (CEM) system 105.

Figure 2:
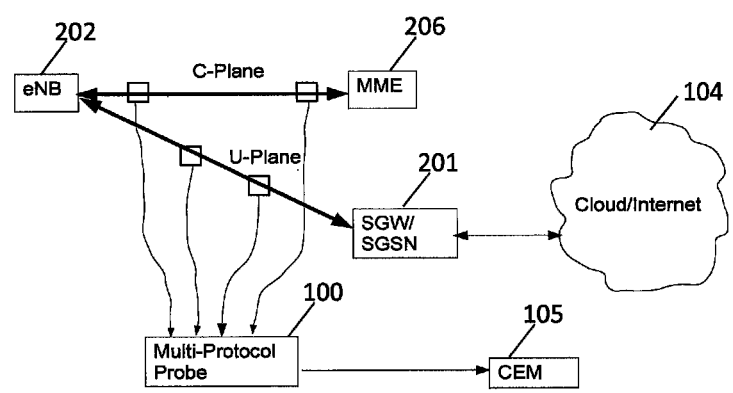
FIG. 2 illustrates the architecture of an exemplary Long Term Evolution (LTE) network according to one embodiment of the disclosure.

Embodiments of the disclosure may be applied to any data network using different communication protocol standards, e.g. Long Term Evolution (LTE) network, 3G network as defined in Third Generation Partnership Project (3GPP) Technical Specifications Releases 4-9. In different data networks, the Probe 100 may be deployed to sniff packets from high speed link over different interfaces, e.g. in the LTE network as shown in FIG. 2, the Probe 100 may sniff traffic flows from LTE interfaces, for instance, LTE S1-U, S4, S11 and S12 interfaces over high speed links. There may be a total of 40 Gbps traffic flows of data packets continuously received by the Probe 100 when each high speed interface is transmitting at 10 Gbps in LTE network. In 3G network, the Probe 100 may be deployed to sniff packets from high speed link over Gn interface as shown in FIG. 3.

Referring to FIG. 2, the Probe 100 is configured to extract traffic flows from both the User-Plane (U-Plane) and the Control-plane (C-Plane). The U-Plane traffic flows basically are related to Internet Protocol (IP) packets data transported between the mobile devices/user equipments (UE) through the evolved NodeB (eNB) 202 and any servers in Cloud/Internet 104. Usually, the IP packets travels through high speed links between mobile devices/UEs and Cloud/Internet 104 via Serving Gateway (SGW)/Service General Packet Radio Service Support Node (SGSN) 201. The C-Plane traffic flows are related to control information such as those transported between eNB 202 and Mobility Management Entity (MME) 206 for customers. As shown in FIG. 2, the Probe 100 may connect to a link between eNB 202 and SGW/SGSN 201 to extract directional traffic flows from the U-Plane, and connect to a link between eNB 202 and MME 206 to extract directional traffic flows from the C-Plane.

Figure 3:
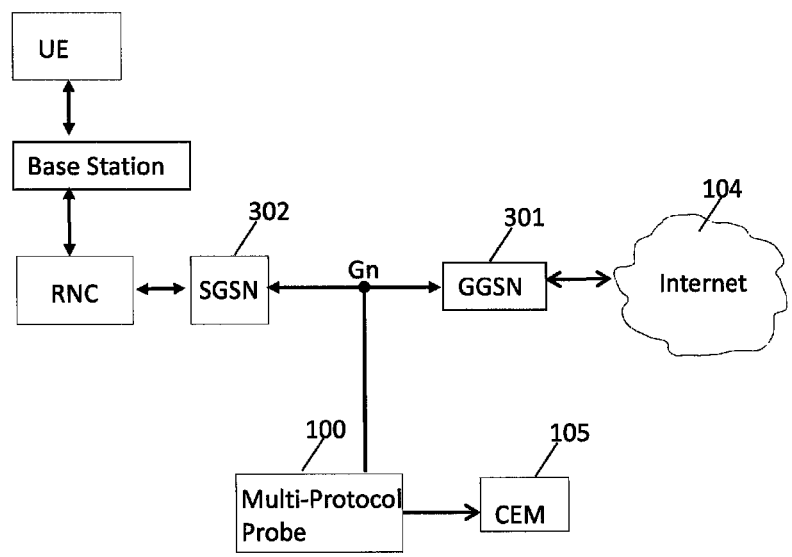
FIG. 3 illustrates the architecture of an exemplary 3G network according to one embodiment of the disclosure.

Referring to FIG. 3, in a 3G network, the Probe 100 may connect to a link between Gateway GPRS Support Node (GGSN) 301 and SGSN 302 to extract traffic flows.

Before the operation of Probe 100 according to the embodiments of the disclosure is described, the basic unit of statistic data collection, i.e. the traffic flow in the Probe 100 is firstly explained. In the present disclosure, three types of traffic flows are described when describing operations of Probe 100. The concept of traffic flows is very important to understand the U-Plane processing.

Directional Traffic Flow:

In TCP/IP networks: "a flow is a series of packets that share the same source and destination IP addresses, source and destination ports, and IP protocol. This is also called a five-tuple IP flow." The five-tuple includes:

Source IP address

Source port number

Destination IP address

Destination port number

IP protocol

Both source and destination addresses must be of the same type, i.e. IPv4 or IPv6 and the flow is directional. If the source and destination are swapped, it becomes a different flow. The IP protocol member specifies the Layer 4 protocol, e.g. TCP, UDP. In the present disclosure, the flow is also called a directional traffic flow.

In 3G/LTE networks, on U-Plane, the directional traffic flow may be characterised by five-tuple and TEID due to IP encapsulation used in tunneling of directional traffic flows. Directional traffic flows transmitted in different directions are assigned different TEIDs. In 3G/LTE networks, the TEID is 32 bits long.

Bi-Directional Traffic Flow

In order to reliably detect application layer protocols, the DPI engine analyses both directions of traffic flows together. In the present disclosure, both directions of traffic flows being analysed together are referred to as a bi-directional traffic flow. A bi-directional traffic flow groups the two directional traffic flows corresponding to opposite directions together. That is to say, the source of one directional traffic flow corresponds to the destination of the other directional traffic flow in opposite direction. The bi-directional traffic flow is specified by a five-tuple similar to the directional traffic flow, which includes:

lower IP address
lower port number
Upper IP address
Upper port number
Layer 4 protocol The difference is that in a bi-directional traffic flow, instead of a source and a destination address, the five-tuple includes a lower and an upper address. Lower refers to a numerically smaller value and upper refers to a numerically greater value. Lower port number refers to the port associated with the lower IP address and not the numerically lower port number.

Thus, suppose the source address is 192.168.1.17 port 2192 and the destination is 11.20.5.34 port 80, the lower IP address and port are 11.20.5.34 port 80 and the upper IP address and port are 192.168.1.17 port 2192. If the source is 11.20.5.34 port 80 and the destination is 192.168.1.17 port 2192 then the lower IP and port are still 11.20.5.34 port 80 and the upper IP address and port are still 192.168.1.17 port 2192. The five-tuple is the same regardless of the source and destination. Thus the direction of data transfer cannot be identified from the bi-directional traffic flow five-tuple. The meaning of the Layer 4 protocol field is the same as that of the IP protocol in the directional traffic flow five-tuple.

Application Traffic Flow

The application traffic flow is a concept used in the statistic reports generated by Probe 100 and sent to the CEM 105. An application traffic flow is specified by a three-tuple:

Internal IP address
External IP address
Application ID (Identifier)

The internal IP address is the IP address of the UE or the mobile phone and is internal to the operator's network. The external address is external to the operator's network, most likely in the Internet. The application ID corresponds to the Layer 7 or application layer protocol, e.g. HTTP, IMAP, etc. This three-tuple is bi-directional similar to the five-tuple of a bi-directional flow. It is also similar in that the application ID generally identifies the destination port and the IP protocol, except when a server is using an unconventional port number for that application/protocol. Essentially, an application traffic flow is the aggregation of possibly multiple bi-directional traffic flows. For example, suppose a UE is connected to a website and has multiple pages open, there will be multiple bi-directional flows each with a different source port in the HTTP between that UE and the web server. In the present disclosure, an application traffic flow may refer to traffic flows from one UE with the same application protocol, or all traffic flows to a specific destination/application server belonging to a particular application protocol.

In order to calculate statistic data of an active traffic flow(s) such as Peak Bit Rate and Average Active Bit Rate for a particular application traffic flow/particular directional traffic flow on U-Plane, the Probe 100 receives packets from high speed directional traffic flows on both C-Plane and U-Plane, generates statistical data for bi-directional traffic flows and then uses the generated statistical data and other related identification information extracted from the bi-directional traffic flows to calculate the statistic data of a particular application traffic flow/particular directional traffic flow on U-Plane. The probe 100 may further use the identifier information obtained from C-Plane such as Fully Qualified Tunnel End Identifier (FTEID), International Mobile Subscriber Identity (IMSI) or Globally Unique Temporary ID (GUTI) to correlate statistic data of a particular application traffic flow/particular directional traffic flow with a subscriber in the data network.

Usually, after the Probe 100 calculates the statistic data of traffic flows corresponding to a large number of customers/subscribers, the calculated statistic data are output or transferred from the Probe 100 to the CEM 105 as shown in FIGS. 1-3.

Figure 4:
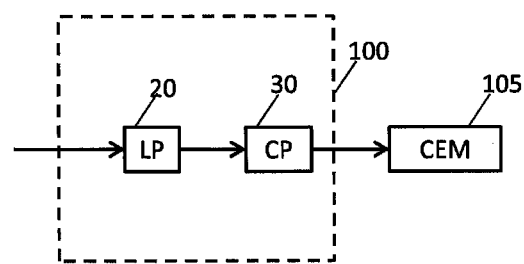
FIGS. 4 (*a*) and (*b*) show the major processing elements in a Probe 100 according to a first embodiment of the disclosure.
Figure 4:
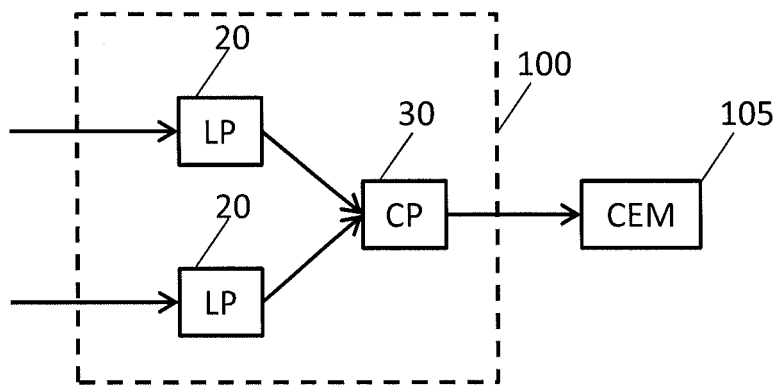
Figure 4:
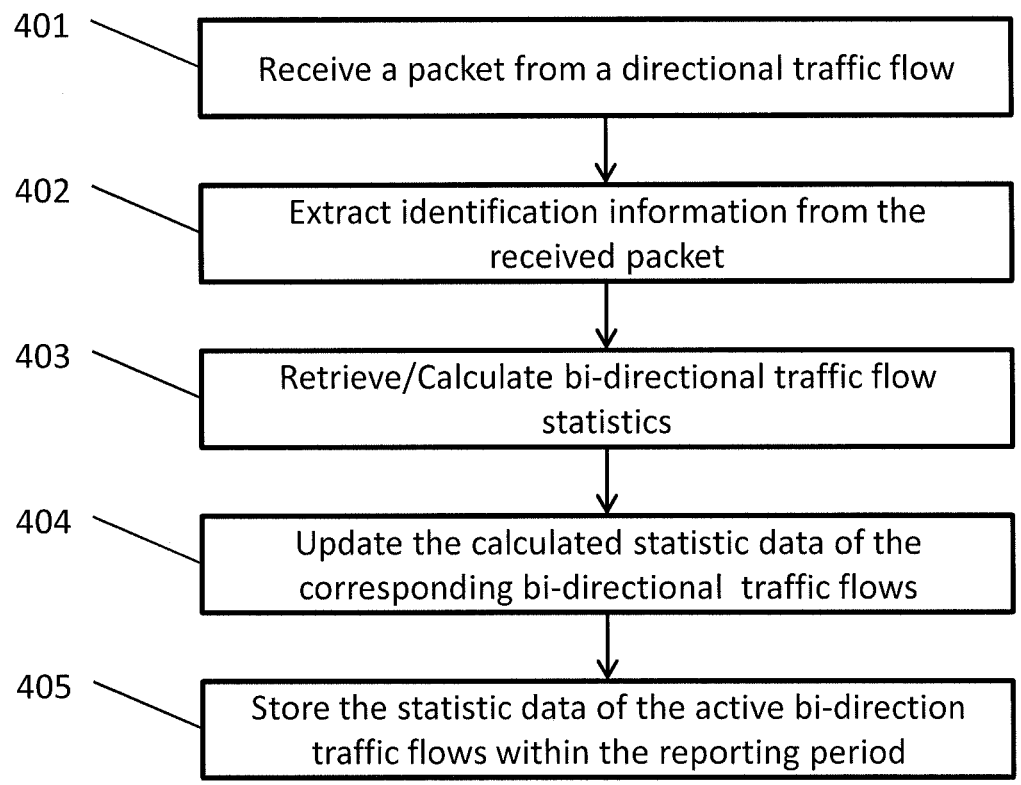

FIGS. 4 (a) and (b) show the major processing elements in a Probe 100 according to a first embodiment of the disclosure. The process of statistical calculation in the Probe 100 may be explained with reference to FIGS. 4 (a) and (b). As shown in FIG. 4 (a), the Probe 100 comprises one link processor (LP) 20 connected to a correlation processor (CP) 30. Since incoming traffic flows in a data network are very fast and the present processing power of any computing electronics may be much limited compared to the transmission speed of a data network, e.g. in LTE network, the transmission speed may be up to 40 Gbps, therefore the Probe 100 may include more than one LP 20 connected to the CP 30. As shown in FIG. 4 (b), the Probe 100 includes two LPs 20 connected to the CP 30. When a plurality of LPs 20 are used to process incoming traffic flows, the LPs work in parallel to extract directional traffic flows, and apply detection on Internet Protocol (IP) packets on each directional traffic flow.

In order to calculate statistic data of all directional traffic flows or application traffic flows from one UE belonging to a particular application protocol, e.g. HTTP, FTP etc., the Probe 100 may use the Deep Packet Inspection (DPI) engine operating in the LP 20 to obtain application layer protocol of the received packets in bi-directional traffic flows. The application layer protocol has unique Application ID in the three-tuple definition of the application traffic flow.

Before each request-response message/packet for any application traffic flow occurs on U-Plane, there may be at least one or some control signalling or control messages transferred on C-Plane, and the LP 20 of the Probe 100 may extract customer/subscriber information thereon such as FTEID, IMSI, GUTI, eNB-UE-S1APID, MME-UE-S1APID and so forth. Thus, the CP 30 receiving output from LPs 20 will further correlate the application traffic flows with the customer/subscriber information in the control signalling or control messages. Subsequently, the CP generates a traffic flow statistic data report regarding individual customer/subscriber and transmits the report to the CEM.

In order to calculate metrics of Active Traffic Flows such as Peak Bit Rate or Average Active Bit Rate for every application traffic flow for each customer, wherein if a single LP 20 cannot handle all of incoming traffic flows, different LPs 20 may be processing packets corresponding to the same application traffic flow. Thus, packets traversed on U-Plane belonging to the same bi-directional traffic flow are processed by the same LP 20. However different bi-directional traffic flow belonging to the same application traffic flow may be concurrently processed by different LPs 20. Here, the Active Traffic is defined for the period where there are active packets (carrying bytes) of any traffic flow transferred on the U-Plane.

In the first embodiment of the disclosure, referring to FIGS. 4 (a) and (b), each LP 20 executes the following processes for every reporting period (e.g., one reporting period is 1 minute) as shown in FIG. 4 (c):

Block 401: Receive a packet from a directional traffic flow

In this block 401, Probe 100 obtains packets from directional traffic flows on U-Plane. If the data network is a 3G/LTE network, the received packet is a GTP packet which includes TEID, Layer 3 IP address and encapsulated IP packet containing {Upper IP address, Lower IP address, Upper port number, Lower port number, Layer 4 Protocol};

If the data network is an ordinary ISP data network, the received packet includes Layer 3 IP address and encapsulated IP packet containing {Upper IP address, Lower IP address, Upper port number, Lower port number, Layer 4 Protocol}, but does not include TEID.

Block 402: Extract identification information from the received packet

In this block 402, Probe 100 may extract {Upper IP address, Lower IP address, Upper port number, Lower port number, Layer 4 Protocol} from the received packet, TEID and Layer 3 IP address in the GTP packet in 3G/LTE network, which may be used by the Probe 100 to uniquely identify any bi-directional traffic flow in a 3G/LTE network;

Alternatively, in a generalized data network of any ISP, the Probe 100 may extract {Upper IP address, Lower IP address, Upper port number, Lower port number, Layer 4 Protocol} from the received packet, which may be used by the Probe 100 to uniquely identify any bi-directional traffic flow in the generalized data network.

Block 403: Retrieve/Calculate bi-directional traffic flow statistic data

In this block 403, each LP 20 may accumulate number of bytes in the received packet for the corresponding bi-directional traffic flow, and the accumulation is performed for the entire lifetime of the bi-directional traffic flow.

Block 404: Update the calculated statistic data of the corresponding bi-directional traffic flow In this block 404, the update may include following:
Increment packet count;
Add number of bytes of this packet;
Extract time of this packet;
Update the corresponding "Active Second Vector" which will be explained below;
Update the corresponding "Period Octet Vector" which will be explained below;
For example, if the received packet is from the uplink traffic flow of the bi-directional traffic flow, then the "Active Second Vector" and "Period Octet Vector" corresponding to the uplink traffic flow of the bi-directional traffic flow will be updated.

Block 405: Store the calculated statistic data of the active bi-direction traffic flow within the reporting period.

When the LP 20 extracts identification information from the received packet, the LP 20 may apply hash function processing on the extracted identification information in the data structure of the active bi-directional traffic flow, and stores the statistic data of the active bi-direction traffic flow within the reporting period in the data structure since this is required by the Deep Packet Inspection (DPI) engine operating in the LP 20. Statistic data and the processed identification information (i.e., the identification information of the packet after the hash function processing) for each directional traffic flow in a bi-directional traffic flow are kept separately in the data structure of the bi-directional traffic flow.

In the first embodiment of the disclosure, the LP 20 may be configured to execute Blocks 401-405 on one thread. The blocks 401-405 are executed repeatedly for each packet on this thread, and another thread is configured to report the updated statistic data of bi-directional traffic flows from each LP 20 to CP 30.

After the CP 30 receives statistic data reports from LP(s) 20, the CP 30 correlates the statistic data of the bi-directional traffic flows with a particular traffic flow or a particular group of traffic flows associated with a predetermined characteristic based on the identification information of the bi-directional traffic flows, e.g. TEID and layer 3 IP address in 3G/LTE networks. After the CP 30 correlates the statistic data of the bi-directional traffic flows with a particular traffic flow or a particular group of traffic flows associated with a predetermined characteristic based on the identification information of the bi-directional traffic flows, the CP 30 further calculates the statistic data of the particular traffic flow or the particular group of traffic flows.

The statistic data of directional or application traffic flows calculated by the CP 30, e.g. number of bytes for directional traffic flows or application traffic flows, number of packets for directional traffic flows or application traffic flows, may be grouped into 2 categories:
(1) Statistic data of directional traffic flows or application traffic flows since the beginning of the traffic flows and going through entire life of the traffic flows;
(2) Statistic data of directional traffic flows or application traffic flows only for the current reporting period, and the statistic data will be reset to zero during the next reporting period. The statistic data of directional traffic flows in a bi-directional traffic flow is stored in a preconfigured data structure and reported to the CP 30 by the LP(s) 20. A preconfigured data structure at least includes: 2 different sets of "Active Second Vectors" and "Period Octet Vectors" respectively corresponding to the two directional traffic flows in the bi-directional traffic flow, i.e. the uplink traffic flow and the downlink traffic flow. The definition or structure of the Data structure and the sets of "Active Second Vectors" and "Period Octet Vectors" will be explained in detail below. Every "Active Second Vector" and "Period Octet Vector" will be reset after the information in the "Active Second Vector" and "Period Octet Vector" is output to the CP 30 at the starting point of a new reporting period.

According to the first embodiment of the disclosure, each LP 20 in the Probe 100 reports statistic data of a bi-directional traffic flow in a preconfigured data structure to the CP 30. Each data structure is a nested structure and may include at least the following pre-configured information:
Upper IP address
Lower IP address
Upper port number
Lower port number
Application ID
Downlink statistic data structure
Uplink statistic data structure The Downlink statistic data structure for one bi-directional traffic flow includes at least following information:
"Number of bytes" received from the downlink traffic flow;
"Number of packets" received from the downlink traffic flow;
"Active Second Vector" for current report period, which is configured to record the active seconds of downlink traffic flow within the current reporting period;
"Period Octet Vector" for current report period, which is configured to accumulate and store statistic data of the downlink traffic flow within the current reporting period, e.g. the number of bytes and the number of packets transferred in the downlink traffic flow;
FTEID of the directional traffic flow.

The Uplink statistic data structure for the same bi-directional traffic flow includes at least following information:
"Number of bytes" received from the uplink traffic flow;
"Number of packets" received from the uplink traffic flow;
"Active Second Vector" for current report period, which is configured to record the active seconds of uplink traffic flow within the current reporting period;
"Period Octet Vector" for current report period, which is configured to accumulate and store statistic data of the uplink traffic flow within the current reporting period, e.g. the number of bytes and the number of packets transferred in the uplink traffic flow;

FTEID of the directional traffic flow.

In 3G/LTE networks, FTEID includes TEID and Layer 3 IP address of GTP packets. This Layer 3 IP address is only for routing encapsulated IP packet inside the LTE network.

Figure 5:
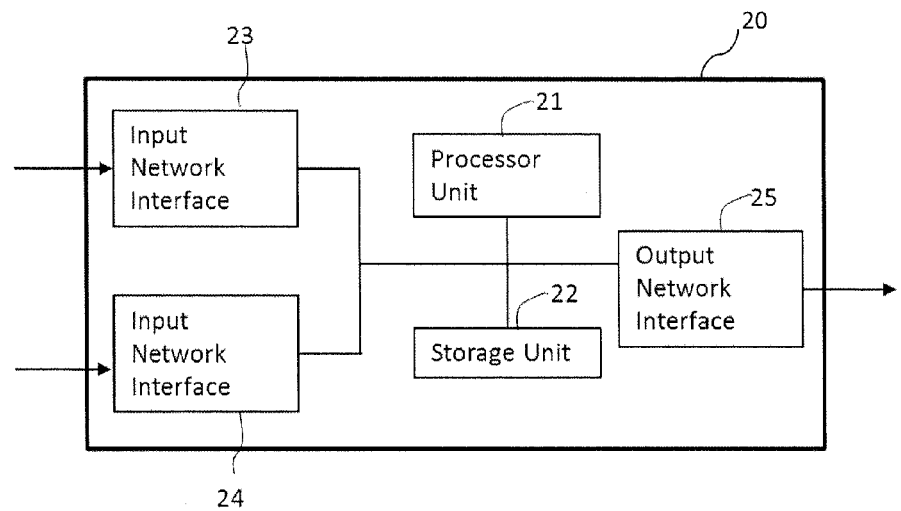
FIG. 5 illustrates the system architecture of a LP in the Probe device according to the first embodiment of the disclosure.

FIG. 5 illustrates system architecture of a LP 20 in the Probe 100 device according to the embodiments of the disclosure. The LP 20 in an embodiment may be used in any data network and connected to any types of interfaces, e.g. LTE S1-U, S4, S11 and S12 interfaces, Gn interfaces in 3G network, etc.

Referring to FIG. 5, a LP 20 in the Probe 100 may include a processor unit 21, a storage unit 22, an output network interface 25, a first input network interface 23 and a second input network interface 24. The LP 20 may also have more than two input network interfaces in other embodiments of the disclosure. All of the components in the LP 20 are electrically/logically connected to one another as illustrated.

In the LP 20, the processor unit 21 is configured to sniff, extract and decode packets from directional traffic flows traversed over both C-Plane and U-Plane in the data network, and store extracted and decoded information in the storage unit 22. The processor unit 21 may be a multi-core processor, and the storage unit 22 may include dynamic memory units and non-volatile memory units. Accordingly, the processor unit 21 may configure part of the dynamical memory units as accumulation memory allocation and then use the accumulation memory allocation to accumulate number of bytes or the number of packets in the received packets from directional traffic flows in the bi-directional traffic flow, and the accumulation is performed for the entire lifetime of the bi-directional traffic flow.

In addition, the processor unit 21 may configure part of the non-volatile memory units to store software execution code of the DPI engine, hash operation/calculation software execution codes and other software execution code for extracting, decoding, obtaining information from the received packets, dynamically constructing data structures and filling in fields in data structures in reports corresponding to active bi-directional traffic flows.

At the end of each reporting period, the processor unit 21 transmits the report to the CP 30 via the output network interface 25.

Figure 6:
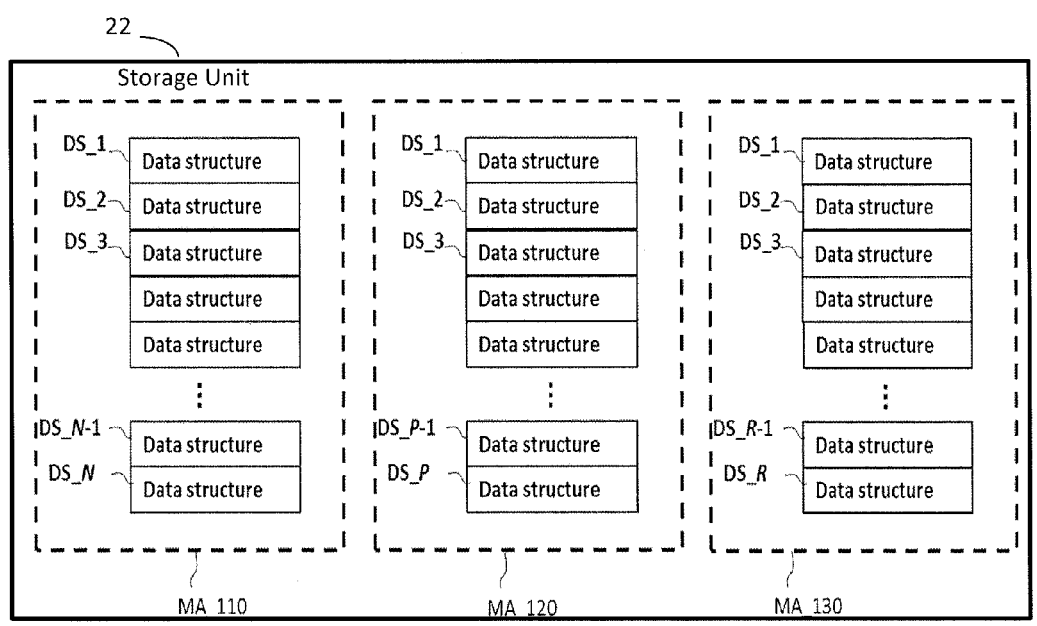
FIG. 6 illustrates the configuration of the storage unit in the LP shown in FIG. 5.

FIG. 6 illustrates a configuration of the storage unit 22 in the LP 20 shown in FIG. 5. Referring to FIG. 5 and FIG. 6, the processor unit 21 in the LP 20 configures N data structures in a memory allocation MA_110 in the storage unit 22 to dynamically accumulate and update information related to bi-directional traffic flows. The update process may be referred to the blocks 402-405 in each LP 20 described in the foregoing paragraphs, and the accumulation is performed for the entire lifetime of each bi-directional traffic flow. Every time the processor unit 21 detects a new bi-directional traffic flow, the processor unit 21 stores information of the newly detected bi-directional traffic flow to an empty data structure among data structures DS_1, DS_2, DS_3, . . . , DS_N-1 and DS_N. For example, if N is 2.4 million and when the number of bi-directional traffic flows reaches upper limit of N, the processor unit 21 uses data structure of the oldest traffic flow, i.e. the data structure DS_1, to store information of the newest traffic flow.

Referring to FIG. 6, besides the memory allocation MA_110, the storage unit 22 also includes a memory allocation MA_120 and a memory allocation MA_130. Each data structure in the memory allocations MA_120 and MA_130 is configured as a data structure to store/accumulate information of one bi-directional traffic flow. Here the information includes both the accumulated statistic data of the bi-directional traffic flow and the identification information extracted from the received packets in the bi-directional traffic flow within one configured reporting period. As explained previously, each data structure may include: Upper IP address, Lower IP address, Upper port number, Lower port number, Application ID, Downlink statistic data structure and Uplink statistic data structure for one bi-directional traffic flow.

More particularly, when the processor unit 21 in the LP 20 receives a packet in a directional traffic flow via one of the input network interfaces 23 or 24, the processor unit 21 stores/accumulates information extracted from the received packet in Downlink statistic data structure or Uplink statistic data structure of one data structure, for instance the data structure DS_1, in the memory allocation MA_120. This process is repeated for every packet received within the current reporting period, and the information will be stored/accumulated in other data structures DS_2, DS_3, DSP-1, DSP in one of the memory allocations MA_120 and MA_130. The number P dynamically varies in every different configured reporting period.

As explained above, during one reporting period, for each active bi-directional traffic flow, one data structure in one of the memory allocations, e.g. memory allocation MA_120, is assigned to store/accumulate information of the each active bi-directional traffic flow. The uplink statistic data and downlink statistic data of a bi-directional traffic flow are stored respectively in the uplink statistic data structure and downlink statistic data structure of the data structure for the bi-directional traffic flow. During one reporting period, the processor unit 21 configures the memory allocation MA_120 to conduct the accumulation process, i.e. to store/accumulate information of active bi-directional traffic flows within this reporting period. When reaching the end/boundary of the reporting period which is also the starting point of the next reporting period, the processor unit 21 configures another memory allocation, i.e. memory allocation MA_130 to conduct the accumulation process within the next reporting period. At the same time, within the next reporting period, the processor unit 21 reports all the statistic data and/or extracted identification information stored in each data structure in the memory allocation MA_120 to the CP 30 via the output network interface 25. Thus, the memory allocations MA_120 and MA_130 are configured as alternately working buffers to conduct the accumulation process, which will be further explained with reference to FIG. 9.

The data structures in the memory allocation MA_110 are configured to accumulate packets during the entire lifetime of all bi-directional traffic flows. On the contrary, the memory allocations MA_120 and MA_130 are configured to alternately to store/accumulate statistic data/extracted identification information for all active bi-directional traffic flows within their configured reporting periods. Each field of data structures DS_1, DS_2, DS_3, DSP-1, DSP in the memory allocation MA_120 and data structures DS_1, DS_2, DS_3, . . . , DSR-1, DSR in the memory allocation MA_130 will be reset after all information stored therein are transferred to the CP 30 at the start of the next preconfigured reporting period. Thus, most of the blocks 401-404 are performed in the memory allocation MA_120 or MA_130 except part of the block 403, such as the accumulation operation of the number of bytes in the received packet for a bi-directional traffic flow during the entire lifetime of the bi-directional traffic flow, which is performed in the memory allocation MA_110. Subsequently, the block 405 refers to storing statistic data of active bi-directional traffic flows within the reporting period in the corresponding data structures of the memory allocation MA_110. It should be noted that the accumulation operations for a bi-directional traffic flow in each LP 20 are not limited to the number of bytes in a received packet or the number of packets received within a pre-configured sampling period or a pre-configured reporting period. For instance, the LP may also be configured to collect the sequence number in the IP header of each received packet corresponding to a bi-directional traffic flow. The collected sequence number may be used by the LP 20 to check and determine whether there are missing packets which are not received, or whether there are packets which arrive in incorrect order, or whether there are duplicated packets which have already been received.

It is noted that, since the size of the memory allocations MA_120 and MA_130 are dynamically configured in response to received packets in directional traffic flows within its pre-configured reporting period, the value of P and R are not fixed and also may not equal to the value of N.

As explained above, each data structure of each bi-directional traffic flow may include Lower IP address, Upper port number, Lower port number, Application ID, Downlink statistic data structure and Uplink statistic data structure. The Downlink statistic data structure and Uplink statistic data structure may be configured to be in similar structures. For instance, Downlink statistic data structure and Uplink statistic data structure may include its packet count, number of bytes transmitted so far, extracted time of the first and last packets in this reporting period, "Number of bytes" received from the directional traffic flow, "Number of packets" received from the directional traffic flow, "Active Second Vector" for current reporting period, "Period Octet Vector" for the current reporting period and FTEID of the directional traffic flow.

Figure 7:
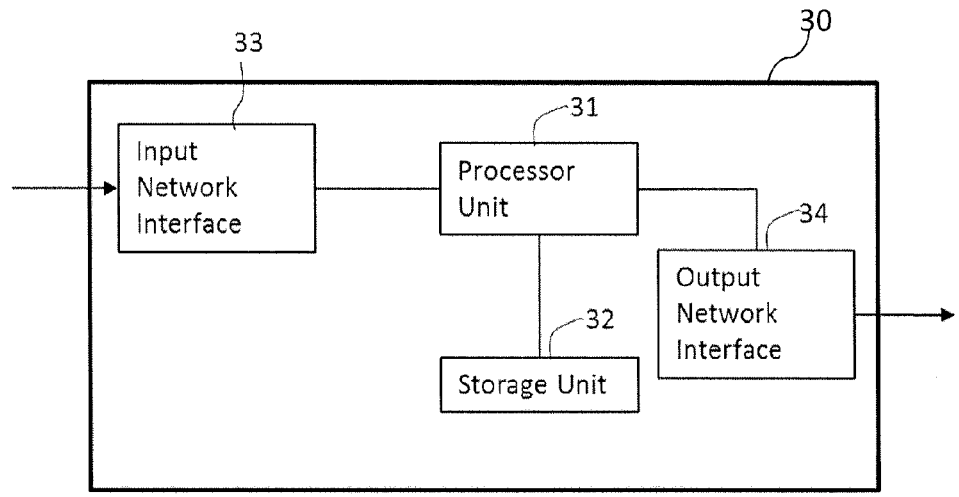
FIG. 7 illustrates system architecture of a correlation processor (CP) in the Probe according to the first embodiment of the disclosure.

FIG. 7 illustrates system architecture of a CP 30 in the Probe 100 according to the first embodiment of the disclosure.

Referring to FIG. 7, a CP 30 in the Probe 100 may include a processor unit 31, a storage unit 32, an input network interface 33, and an output network interface 34. The CP 30 may have more than one input network interfaces or more than one output network interfaces in other embodiments.

The components of the CP 30 are electrically/logically connected to one another as illustrated.

The input network interface 33 is connected to LP(s) 20 to receive reports from the LP(s) 20 as shown in FIGS. 4 (a) and (b).

In the CP 30, the processor unit 31 is configured to be able to correlate the reported information of bi-directional traffic flows from the LPs to a particular application traffic flow associated with a predetermined characteristic based on the identification information of the bi-directional traffic flows and the predetermined characteristic of the particular application traffic flow. Thus, the reported information related to the particular application traffic flow shall be identified. The processor unit 31 may also use identification information of the particular application traffic flow from C-Plane and U-Plane to map the particular application traffic flow to a particular customer/UE, and generate statistic data report about a particular application traffic flow/customer/UE to the CEM 105 as shown in FIGS. 1-3.

In the embodiments of the disclosure, the processor unit 31 may be a multi-core processor and may assign the same thread to process information of bi-directional traffic flows belonging to the same application traffic flow.

The storage unit 32 may include dynamic memory units and non-volatile memory units. Accordingly, the processor unit 31 configures part of the dynamic memory units as memory allocation for calculating statistic data of bi-directional traffic flows belonging to a particular application traffic flow. Also, the processor unit 31 may configure part of the non-volatile memory units to store software execution code for calculating statistic data information based on the reported data structures from the LP(s) 20.

In addition, the processor unit 31 transmits the calculated statistic data information of application traffic flows to the CEM 105 via the output network interface 34.

The embodiments of the disclosure may be applied to any network with C-Plane and U-Plane, e.g. LTE network or a data network for hybrid of 3G/4G wireless communication network. In a data network supporting 3GPP technical specification Release 7/8, the U-Plane traffic in the network is carried by GPRS Tunnelling Protocol (GTP) packets. In order to illustrate the approach of identifying traffic flows corresponding to unique customer, a simplified GTP packet structure is illustrated in FIG. 8.

Figure 8:
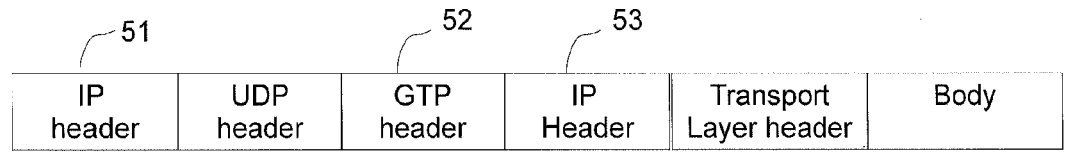
FIG. 8 illustrates a User-Plane (U-Plane) GPRS tunneling packet (GTP).

FIG. 8 illustrates a User-Plane (U-Plane) GPRS tunneling packet (GTP). Referring to FIG. 8, U-Plane GTP packets transferred in data network are encapsulated in UDP packets. Thus, the IP header 51 and UDP header respectively containing source and destination IP addresses and port numbers are used internally of the core network but will be stripped off once the U-Plane GTP reaches the Serving Gateway of the data network. In order to identify the traffic flows, the Tunnel endpoint Identifier (TEID) in GTP header 52, source and destination IP addresses in consecutive IP header 53, and source and destination port numbers in consecutive transport layer header are utilised.

Since directional traffic flows are assigned unique FTEIDs, every LP 20 will use a look-up table to map the directional traffic flows with the same pair of source-destination IP addresses and port numbers as the same bi-directional traffic flow. The tunneled IP addresses and port numbers and the FTEIDs corresponding to each bi-directional traffic flow will be provided by the LP 20 to CP 30. Namely, each bi-directional traffic flow is identified by not just IP addresses and port numbers but also the associated TEIDs in the GTP headers and Layer 3 destination IP address.

In the C-Plane, the directional traffic flows are identified by, IMSI and FTEID, where the FTEID in U-Plane will match the FTEID in the C-Plane.

According to the first embodiment of the disclosure, each LP 20 in a probe 100 may generate information, e.g. a Data structure, for each bi-directional traffic flow and send it to the CP 30 for calculating statistic data for a particular type of traffic flow, e.g. a particular application traffic flow which includes a plurality of bi-directional traffic flow. However, in other embodiments, each LP may also calculate the statistic data for a particular traffic flow firstly, and then send the calculated statistic data along with the identification information of the particular traffic flow to CP 30. Thus, the correlation processing at the CP 30 may be greatly reduced.

In order to provide statistic data of application traffic flows, each LP 20 in a probe 100 may separately calculate the aggregated number of bytes for different application layer protocols in all active bi-directional traffic flows within a predetermined reporting period, then reports the aggregated number of bytes in each reporting period along with the application layer protocols to the CP 30. The application layer protocol may be HTTP, VoIP protocol, or SMTP, etc. In addition, each LP 20 may also firstly calculate the aggregated number of bytes for different application layer protocol types and different UEs in all active bi-directional traffic flows within a predetermined reporting period, then reports the aggregated number of bytes in each reporting period along with the application layer protocol types and the IP addresses of the UEs to the CP 30. The CP 30 then may further calculate statistic data of application traffic flows for specific UEs and specific application layer protocols.

In addition, each LP 20 in a probe 100 may also separately calculate the aggregated number of bytes in each reporting period for different application layer protocols and different servers in all active bi-directional traffic flows. The application layer protocols may include HTTP, VoIP protocol, SMTP, etc. The servers may include a HTTP server, mail server, or a NAT server protecting internal HTTP, Mail, VoIP server, etc. Then, the LP (s) 20 report the aggregated number of bytes for bi-directional traffic flows along with the application layer protocols in "Data structures" to the CP 30. Under this scenario, the CP 30 may further calculate statistic data for application traffic flows between specific servers and specific UEs.

In order to obtain statistic data of traffic flows in terms of bearer QoS in LTE network or 3G/4G network, for all active bi-directional traffic flows, the LP(s)20 need to report to CP 30 with different bearers in LTE or 3G/4G network and the corresponding IP addresses assigned to the bearers. According to 3GPP standards, different bearer Quality of Service (QoS) has different IP addresses. Therefore, the "Data structure" for a bi-directional traffic flow may include both the bearers corresponding to the bi-directional traffic flow and the IP addresses assigned to the bearers, or the FTEID which further includes IMSI unique to a customer or a UE with a unique SIM.

In some cases, the IP packets may be associated with upper layer applications such as Web Browsing, streaming, voice over IP (VoIP), video over IP or email. In this case, the metadata information associated with the upper layer applications such as universal resource locator (URL), coding format and file type may be extracted by LPs as well. As such, the LPs may also store the extracted information associated with a specific upper layer application from the data packets, and transfer the extracted information corresponding to particular bi-directional traffic flows to the CP 30 for further correlation processing. The correlated information of upper layer applications such as universal resource locator (URL), coding format and file type done by the CP 30 corresponding to different customers may be sent to CEM 105 of the operator of the data network.

In addition, when the metrics of all traffic flows for a particular website is calculated, e.g. the Peak Bit Rate or Average Active Bit Rate, each LP 20 in the Probe 100 needs to extract "Domain Name" from the received IP packets and report the "Domain Name" and IP address of the website server in the corresponding Data structures to the CP 30. Then the CP 30 may add up aggregation of traffic flows according to the "Domain Name" and the IP address of the website.

Figure 9:
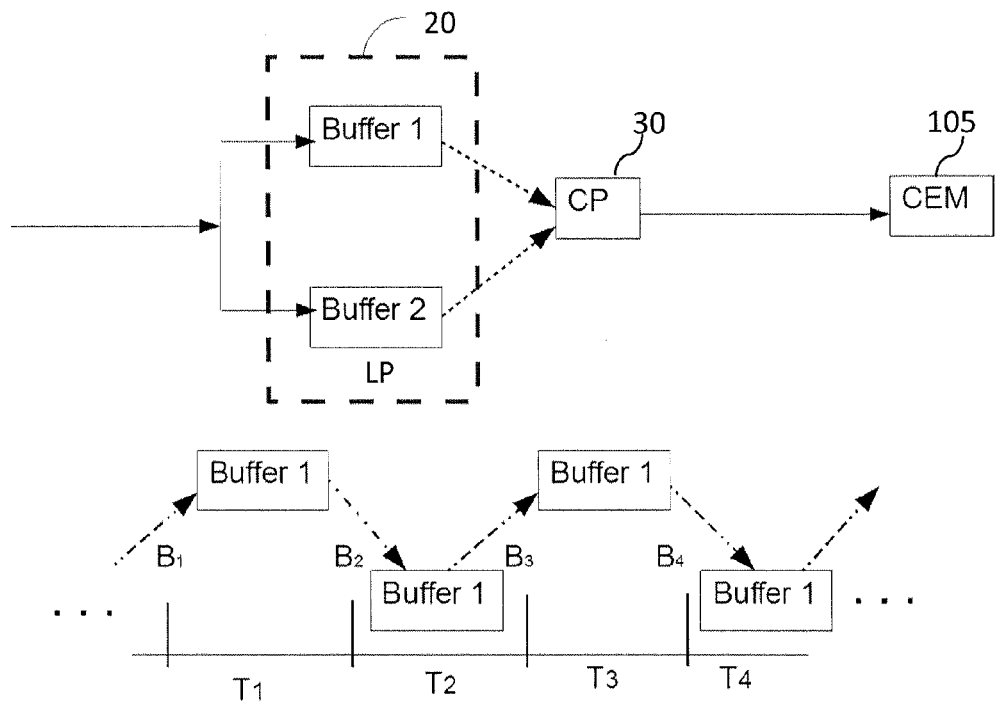
FIG. 9 illustrates a time-alignment of two alternately working buffers in one LP according to the first embodiment of the disclosure.

It should be noted that when more than one LPs 20 are provided in the Probe 100, e.g. two LPs are used as shown in FIG. 4 (*b*), before any report is generated from any LP 20, a Time-Alignment procedure such as utilising Network Time Protocol (NTP) is executed to synchronize the reporting period boundary or minute boundary B1 and B2 shown in FIG. 9. Embodiments of the disclosure are not limited to NTP and may be implemented with other distributed time-synchronisation mechanisms.

Since transferring data from the buffer memory of any LP 20 to the CP 30 takes time, time variations resulted from transferring data from the buffer memory is observed very frequently if only one memory buffer is used for concurrently accumulating packets for current reporting period and transferring information generated based on the packets received in the previous reporting period. Especially when there is huge amount of information (e.g., several hundreds of Megabytes) accumulated in the previous reporting period, the transferring operation may take a longer time until the transferring is complete, and thus resulting in a delay in the range of a few seconds for initiating the same memory buffer to accumulate information for the current reporting period. Due to delay of the few seconds for initiating the accumulation process, information of some packets which arrive in the first few seconds may not be extracted, decoded, processed and accumulated, which further results in inaccurate statistic data of bi-directional traffic flows. An embodiment of the disclosure provides a simple buffering process utilised in all embodiments. For the simplicity of illustration, only one LP with two alternately-serving buffers is shown in FIG. 9. FIG. 9 illustrates a time-alignment of two alternately working buffers in one LP 20 according to the first embodiment of the disclosure. The two working buffers here correspond to the MA_120 and MA_130 in the storage unit 21 as shown in FIG. 5.

In order to prevent time variations for reporting/transferring data from the LP 20 to the CP 30, alternately-serving Buffers 1 and 2 are utilised by each thread in each LP 20. During the first reporting period of T1 starting from reporting boundary B1, the Buffer 1 is configured to be used for accumulating bytes from incoming traffic flows and the Buffer 2 is configured to be used for transferring all data stored in Buffer 2, if any, to the CP 30. When the first report period of T1 reaches its end, i.e. when the reporting boundary B2 is reached, the second reporting period starts from the reporting boundary B2, the Buffer 1 is configured to be used for transferring all data stored in Buffer 1 to CP 30 and the Buffer 2 is configured to be used for accumulating bytes from incoming traffic flows within the second reporting period.

The similar alternate serving pattern between Buffer 1 and Buffer 2 continues to achieve fast transfer of data from the LP 20 to the CP 30 while minimizing undesirable temporal impact of such data transfer. In general, every time when the reporting period boundary is reached such as B1, B2, B3, B4 and so forth, the currently accumulating Buffer in a LP 20 is alternated with the other buffer in the same LP 20.

Figure 10:
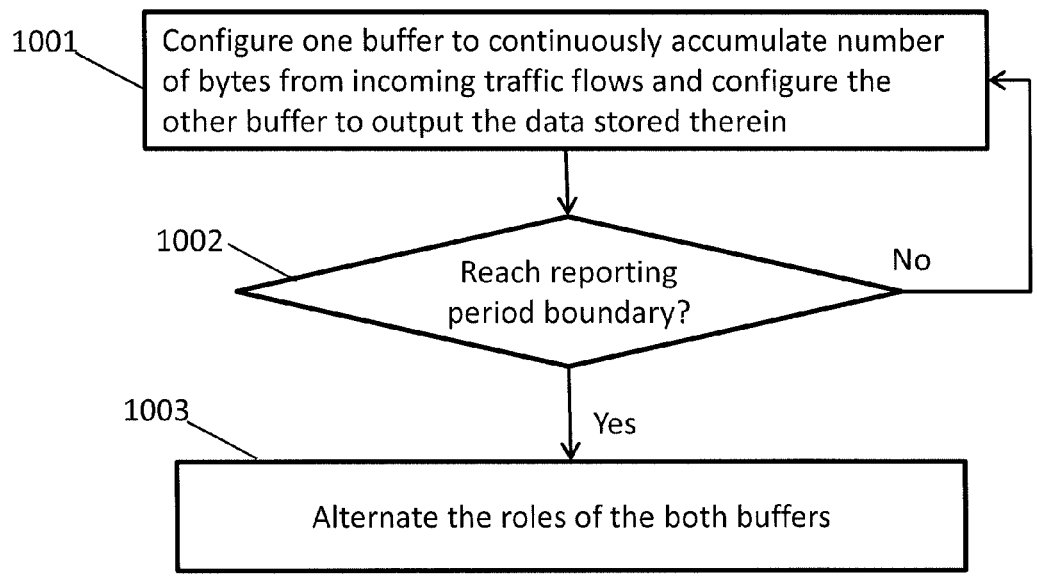
FIG. 10 is a flowchart illustrating how a LP controls two alternately working buffers for minimizing time variance for transferring data from the LP to the CP according to the first embodiment of the disclosure.

The process of such alternating is illustrated in FIG. 10. FIG. 10 is a flowchart illustrating how a LP 20 controls two alternately working buffers for minimizing time variance for transferring data from the LP 20 to the CP 30 according to the embodiment of the disclosure. As shown in FIG. 10, the process includes the following:

Block 1001: configure a first buffer to be used for accumulating number of bytes from incoming traffic flows and configure a second buffer to be used for outputting the data stored therein to the CP 30 within a first reporting period. In the initial state, the second buffer is not used for accumulating any information related to bi-directional traffic flows, and thus it shall not be configured to be used for outputting any data stored therein to the CP 30.

Block 1002: Determine whether the reporting time boundary of the first reporting period is reached, if yes, go to block 1003, if no, go back to block 1001.

Block 1003: Alternate the roles of the both buffers. Specifically, reconfigure the first buffer used for accumulating number of bytes from incoming traffic flows in block 1001 to be used for outputting the data stored therein within the second reporting period; at the same time reconfigure the second buffer to be used for accumulating number of bytes from incoming traffic flows within the second reporting period.

In the Blocks 1001-1003, the process of accumulating number of bytes from incoming directional traffic flows may be changed to accumulating information extracted from packets of incoming direction traffic flows. For instance, the LP 20 may also configure the buffer to accumulate number of packets in bi-directional traffic flows. Each thread in the Processor unit 21 of the LP 20 may configure the alternately-working buffers to accumulate and output both number of bytes and number of packets from incoming direction traffic flows in active bi-directional traffic flows.

In order to satisfy the fast processing requirement of the Probe 100, in the above process (4) of "Update the statistics of bi-directional traffic flows", memory for the data structures is allocated at system startup and is not resized after system initialisation (e.g. the memory 110, 120 and 130 in the storage unit 22 shown in FIG. 6). Thus when the number of bi-directional traffic flows reaches a preconfigured upper threshold, then the LP 20 must reuse memory that was used by another bi-directional traffic flow. It chooses to reuse the memory of the least recently used bi-directional flow.

Figure 11:
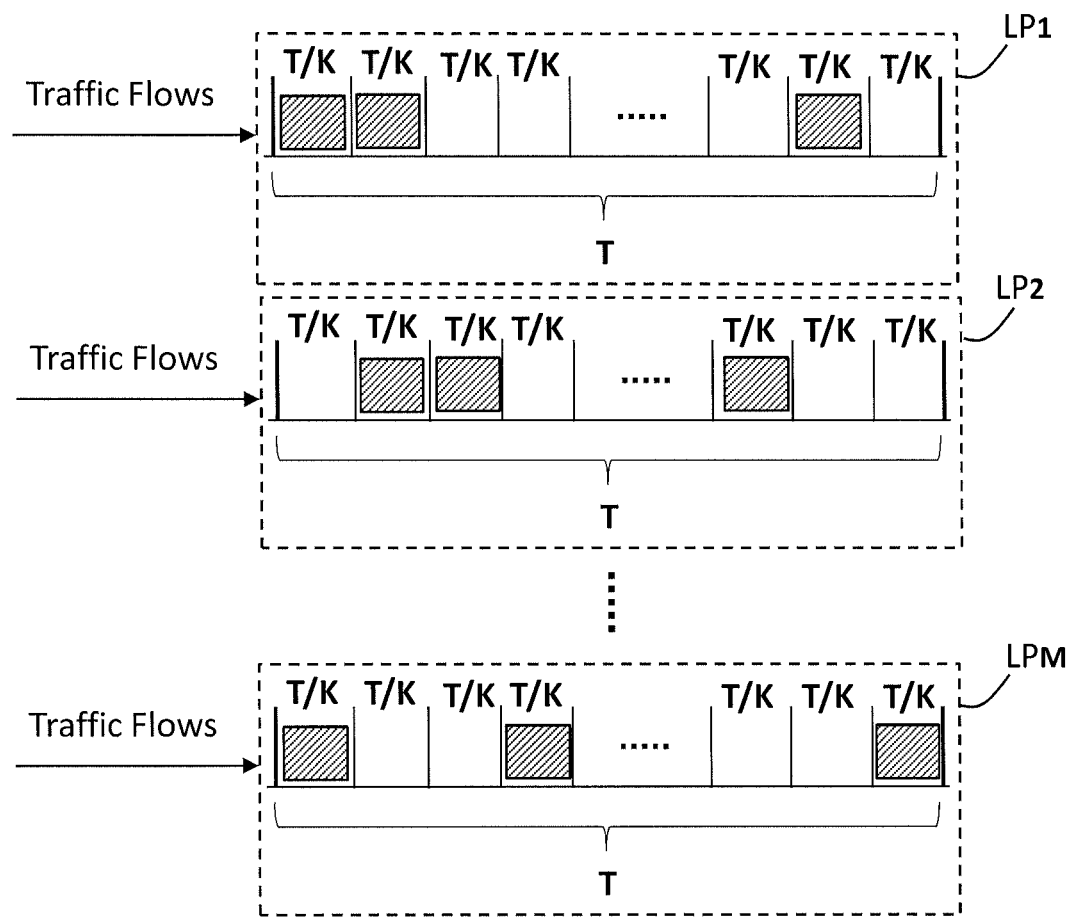
FIG. 11 illustrates the process of processing traffic flows in a data network according to a second embodiment of the disclosure.

As previously explained, in order to obtain more accurate and correct metric of Active Traffic Flows such as Peak Bit Rate and Average Active Bit Rate for a particular traffic flow(s), real-time traffic flow analysis is required. A reporting period T of 60 seconds may be too long to obtain a correct or accurate metric. Referring to FIGS. 4(*a*) and (*b*), the Probe 100 in the embodiment of the disclosure may comprise M (M>=1) LPs 20 connected to one CP 30 for processing packets of multiple bi-directional traffic flows within a reporting period T. Each LP 20 reports its "Active Second Vectors" and "Period Octet Vectors" in a Data structure for every active bi-directional traffic flow to the CP 30 in each reporting period T. The reporting period T in the embodiments of the disclosure may be divided into K (K>=2) equivalent sampling periods. K and M are positive integers. FIG. 11 illustrates the process of processing traffic flows using M (M>=1) LPs in a data network according to a second embodiment of the disclosure.

In this second embodiment, every LP 20 includes two memory buffers; each memory buffer is configured to store a Data structure for each bi-directional traffic flow. A Data structure is configured to comprise one "Active Second Vector" and one "Period Octet Vector" for each directional traffic flow in the bi-directional traffic flow.

Each "Active Second Vector" is configured to comprise L1 (L1>=2) Boolean elements in any of the memory buffers, L1 may be equal to K or greater than K. Each Boolean element corresponds to a sub-sampling period. When there is data transferred in any active second, the Boolean element in an "Active Second Vector" in the Data structure corresponding to that active second is set (set to TRUE) by the responsible LP 20; Otherwise, the Boolean element in the "Active Second Vector" in the Data structure corresponding to that active second is reset (set to False) by the responsible LP 20. In addition, when there is more than one LP for processing traffic flows, all of the LPs synchronize starting point and ending point of their reporting period by, for instance, network time protocol (NTP).

Each "Period Octet Vector" is configured to comprise L2 data elements, (L2>=2), L2 may be equal to K. Each data element stores the number of data bits retrieved by the LP within its preconfigured sampling period for the corresponding bi-directional traffic flow. Every data element may have same preconfigured sampling period, which may be equal to 1/L2 of reporting period T.

Every time when a reporting period boundary is reached, every LP 20 reports its "Active Second Vectors" and "Period Octet Vectors" in Data structures for active bi-directional traffic flows to the CP 30 in one reporting period T, and then resets all "Active Second Vectors" and "Period Octet Vectors" in the Data structures for all active bi-directional traffic flows.

In order to obtain Average Active Bit Rate for a particular application traffic flow, CP 30 uses related identification information extracted from C-Plane and/or Upper IP address, Lower IP address, Upper port number, and Lower port number in the received Data structures of bi-directional traffic flows reported by each LP 20 to correlate the Data structures of bi-directional traffic flows with the particular application traffic flow associated with a predetermined characteristic based on the identification information in the Data structures of the bi-directional traffic flows. Thus, the Data structures of bi-directional traffic flows related to the particular application traffic flow are identified. The CP 30 then applies logical OR on all "Active Second Vectors" in the identified Data structures of bi-directional traffic flows belonging to the particular application traffic flow to obtain the total number of active seconds when there had been data actively transferred for the particular application traffic flow. Next, the CP 30 sums up all Delta bytes in "Period Octet Vectors" in the identified Data structures of bi-directional traffic flows belonging to the particular application traffic flow and divides the summed Delta bytes by the total number of active seconds for the particular application traffic flow to generate Average Active Bit Rate for the particular application traffic flow.

In order to obtain Peak Bit Rate (or Peak Traffic Flow or Peak Bits per second or maximum bits per second) for a particular application traffic flow, the CP 30 respectively aggregates the number of data bits in "Period Octet Vectors" in the Data structures for bi-directional traffic flows belonging to the particular application traffic flow from different LPs 20 in the K equivalent sampling periods. Then, the CP 30 selects the greatest numerical figure to calculate the Peak Bit Rate for the particular application traffic flow.

Figure 12:
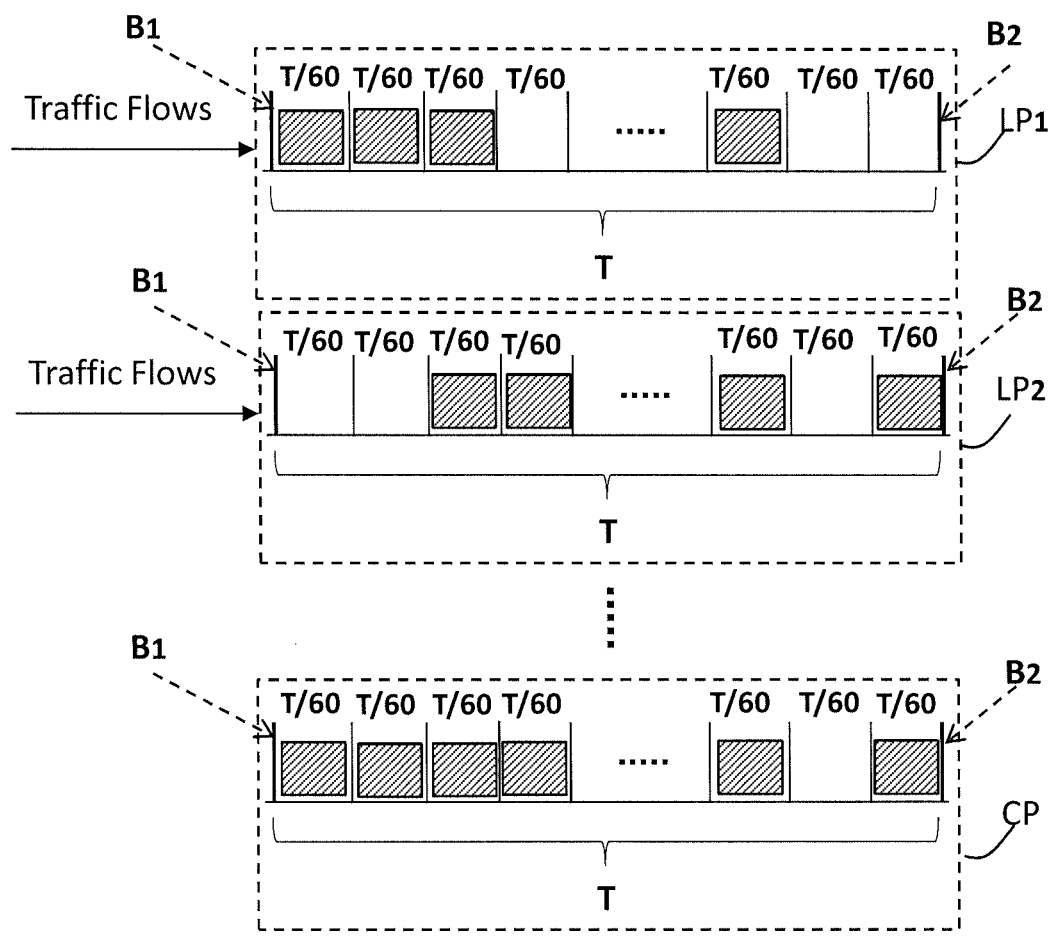
FIG. 12 illustrates the process of processing traffic flows according to a first example of the second embodiment of the disclosure in FIG. 11.

In a first example, K=L1=L2=60, reporting period T=60 seconds and two LPs 20 in the Probe 100. FIG. 12 illustrates the process of processing traffic flows according to the first example of the second embodiment of the disclosure.

In this example, the probe 100 comprises two link processors. In every link processor, for every active bi-directional traffic flow, a data structure is configured to store/accumulate information related to the active bi-directional traffic flow. Each Data structure may comprise two "Period Octet Vectors" configured to respectively store statistic data of two directional traffic flows in the active bi-directional traffic flow within a predetermined reporting period T. The data structure may further comprises two "Active Second Vectors" configured to respectively record active seconds of two directional traffic flows in the active bi-directional traffic flow within the predetermined reporting period T.

As shown in FIG. 12, each element in an "Active Second Vector" corresponds to a preconfigured sampling period: 1/60 of a predetermined reporting period T. When there is data transferred during the preconfigured sampling period of any element in the "Active Second Vectors", the responsible LP sets that particular element as TRUE; otherwise, the value of that particular element is not changed. Also, when reaching the next reporting period boundary, the LPs resets every element in every "Active Second Vector".

The CP 30 receives the data structures from both LPs 20. For each LP 20, each "Period Octet Vector" in one Data structure may include statistic data or information retrieved and updated at the blocks 403-404 for one directional traffic flow in any active bi-directional traffic flow. Since there might be thousands or even tens of thousands of directional traffic flows received by any LP, each Data structure also includes two sets of "Active Second Vectors" and "Period Octet Vectors" for every retrieved and updated bi-directional traffic flow. Then, the CP 30 at the receiving end may easily calculate statistic data of application traffic flows/directional traffic flows based on the received "Active Second Vectors" and/or "Period Octet Vectors" in Data structures from different LPs 20.

The Average Active Bit Rate cannot be calculated by simply aggregating total number of bytes during an active connection period and then divide the aggregated number of bytes by the active connection period. In the embodiment of the disclosure, more accurate calculation of Average Active Bit Rate for every directional traffic flow is provided.

The Average Active Bit Rate may be defined as D1/T2, where D1 is the delta bytes transferred on one directional traffic flow for a reporting period, where the delta bytes is the total number of bytes transferred in the directional traffic flow; and T2 is a total number of active seconds in a reporting period. Here, the active second refers to a short period (e.g., T/60 minutes) where data is transferred for the directional traffic flow.

In this example, every LP 20 such as a first LP (LP1) and a second LP (LP2) shown in FIG. 12 in the Probe 100 may include two memory buffers. Each "Active Second Vector" in one Data structure for every directional traffic flow in any of the memory buffers is configured to comprise 60 Boolean elements. When there is an active directional traffic flow for one bi-directional traffic flow in any active second, the Boolean element in the active second vector corresponding to that active second is set (set to TRUE) by the responsible LP; Otherwise, the Boolean element in the active second vector corresponding to that active second is reset (set to False) by the responsible LP. All LPs synchronise starting point and ending point of their reporting period by, for instance, network time protocol (NTP).

Also, all Boolean elements in the "Active Second Vectors" in the Data structure are reset by its LP after the information stored therein is completely transferred to the CP at a next reporting period boundary (the starting point of the next reporting period).

At the end of one reporting period T, when the CP receives all Data structures reported by all LPs, the CP can calculate Average Active Bit Rate (or Average Active Traffic Flow) for a particular active directional traffic flow/a particular application traffic flow in that reporting period T.

Average Active Bit Rate

For calculating Average Active Bit Rate for a particular directional traffic flow, the CP applies logical OR on all "Active Second Vectors" from multiple LPs to obtain the total number of active seconds when there had been packets actively transferred over that particular directional traffic flow. Then, the CP sums up the number of bytes in all "Period Octet Vectors" from multiple LPs for that particular directional traffic flow. Next, the CP obtains the Average Active Bit Rate as "the summed number of bytes" divided by "the number of active seconds".

For calculating Average Active Bit Rate for a particular application traffic flow, the CP 30 correlates the received Data structures of all bi-directional traffic flows with the particular application traffic flow associated with a predetermined characteristic based on the identification information in the data structures of the bi-directional traffic flows to identify the received data structures related to the particular application traffic flow. Next, the CP 30 applies logical OR on all "Active Second Vectors" in the identified data structures of bi-directional traffic flows belonging to the particular application traffic flow to obtain the total number of active seconds when there had been packets actively transferred for that particular application traffic flow. Then, the CP 30 sums up all delta bytes in "Period Octet Vectors" in the identified data structures of bi-directional traffic flows belonging to the particular application traffic flow; next the CP 30 divides the summed delta bytes by the total number of active seconds for the particular application traffic flow to generate Average Active Bit Rate for the particular application traffic flow.

Peak Bit Rate for a Particular Application Traffic Flow

In a second example, K=L1=L2=3, two LPs 20 are provided in the Probe 100, the CP 30 may be configured to use the "Active Second Vectors" and "Period Octet Vectors" in data structures corresponding to directional traffic flows in bi-directional traffic flows belonging to a same particular application traffic flow reported from all LPs 20 to obtain Peak Bit Rate for that particular application traffic flow.

Figure 13:
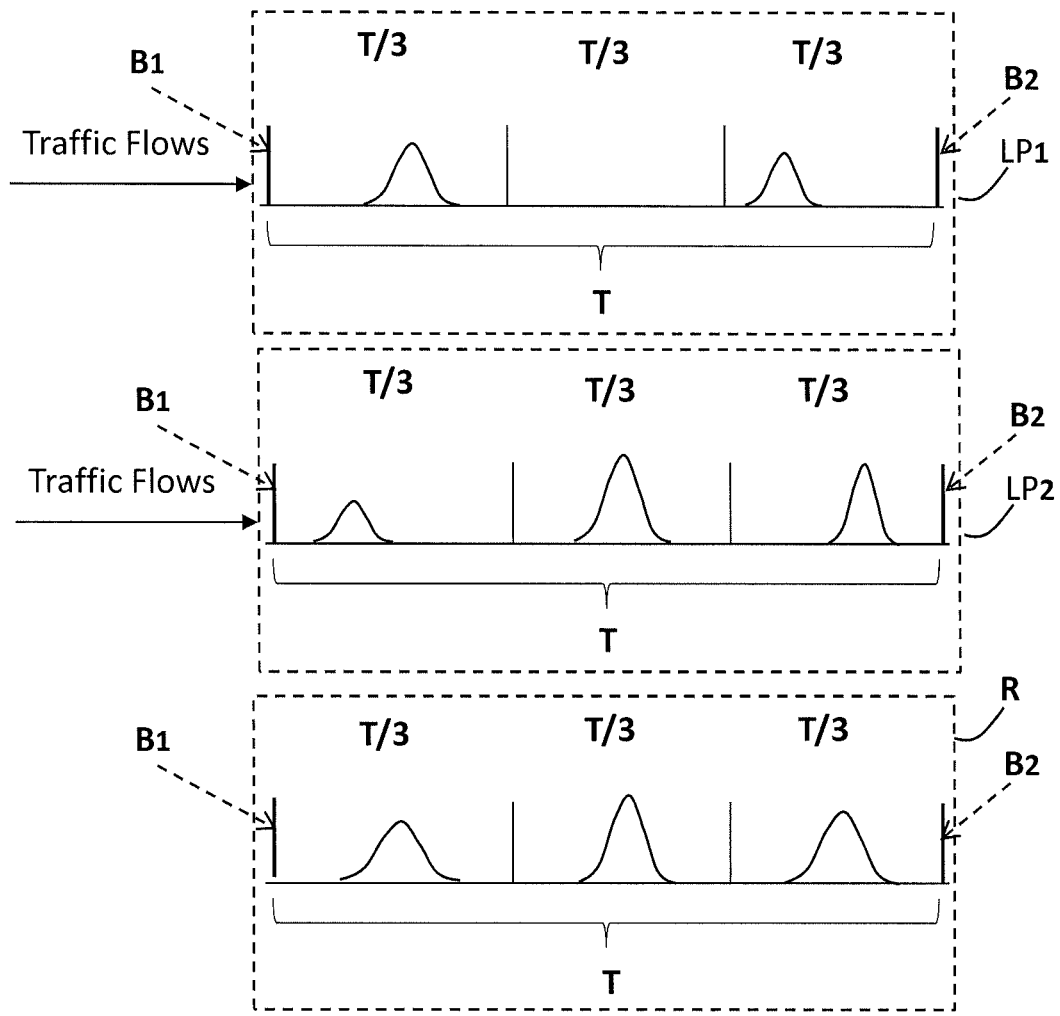
FIG. 13 illustrates the process of processing traffic flows according to a second example of the second embodiment of the disclosure in FIG. 11.

In this example, each "Period Octet Vector" reported from all Link Processors includes three elements corresponding to a sampling period which is equal to ⅓ reporting period T as shown in FIG. 13.

As illustrated in FIG. 13, in the first T/3 sampling period, at the LP1, there is an active traffic flow with the number of bytes as 10 Mega Bytes (MB) for a first bi-directional traffic flow belonging to a particular application traffic flow; In the third T/3 sampling period, at the LP1, there is an active traffic flow with number of bytes as 5 MB for the same first bi-directional traffic flow belonging to the particular application traffic flow.

On the other hand, at the LP2, there is an active traffic flow with number of bytes as 15 MB for the same second bi-directional traffic flow belonging to the particular application traffic flow in the second T/3 sampling period; and an active traffic flow with number of bytes 12 MB for the same second bi-directional traffic flow in the third T/3 sampling period. Both the LP1 and LP2 report their "Period Octet Vectors" for the first and second bi-directional traffic flows belonging to the same application traffic flow. The "Period Octet Vectors" in this case include the number of bytes within the first, second and third T/3 sampling periods.

Then, the CP may calculate the Peak Bit Rate as following: (i) determine the number of active seconds in each T/3 sampling period AC1, AC2, AC3, which may be obtained by respectively performing logical OR operations on the first, second and third T/3 sampling period; (ii) sum up number of bytes in all T/3 sampling periods respectively to obtain another set of three values of BT1, BT2, BT3; (iii) Respectively divide BT1 by AC1, divide BT2 by AC2, divide BT3 by AC3 to obtain three aggregated data rates, APD1, APD2 and APD3 respectively corresponding three T/3 sampling periods; and (iv) select the maximum among the APD1, APD2 and APD3. In FIG. 13, the portion enclosed by dashed square with label of "R" illustrates the resultant value of BT1, BT2, BT3 as obtained from the calculation procedure (ii).

In this example AC1=AC2=AC3=T/3,
BT1=10+2=12 MB, BT2=0+15=15 MB, BT3=5+12=17 MB Hence, APD1=BT1/AC1=36/T, APD2=BT2/AC2=45/T, APD3=BT3/AC3=51/T. Accordingly, the Peak Bit Rate obtained by this example is APD3=51/T. If T=60 seconds, then the Peak Bit Rate is 0.85 MB/second.

A more accurate method for obtaining Peak Bit Rate will be given in the third example, wherein K=3, L1=60, L2=3, two LPs are provided in a Probe 100. Since the denominators used in the method are corresponding to the active second (T/60), which is shorter than T/3, the final result of Peak Bit Rate is more accurate than that shown in the above second example.

In this third example, the LP1 obtains the number of active seconds in the first T/3 sampling period as 8T/60; obtains the number of active seconds in the second T/3 sampling period as 0T/60; obtains the number of active seconds in the third T/3 sampling period as 12T/60. On the other hand, the LP2 obtains the number of active seconds in the first T/3 sampling period as 18T/60; obtains the number of active seconds in the second T/3 sampling period as 15T/60; obtains the number of active seconds in the third T/3 sampling period as 16T/60. Then, after the CP applying logical OR operation on all "Active Second Vectors" corresponding to directional traffic flows belonging to the same application traffic flow, assuming there is no overlapping between the active seconds of the two LPs, the aggregated active seconds for each of the three T/3 sampling periods respectively are
AC1=26T/60, AC2=15T/60, AC3=28T/60, then according to this method,
BT1=10+2=12 MB, BT2=0+15=15 MB, BT3=5+12=17 MB
APD1=BT1/AC1=720/26T, APD2=BT2/AC2=60/T, APD3=BT3/AC3=255/7T Therefore, the Peak Bit Rate should be 60/T (corresponding to the second T/3 sampling period), if T=60 seconds, then the Peak Bit Rate is 1 MB/second. Clearly, the method according to the third example is more accurate. It should be noted that if there is overlapping between the active seconds of the two LPs, then the active seconds for the first and third T/3 sampling period may be less, accordingly the corresponding APD1 and APD3 may be greater.

Other embodiments will be apparent to those skilled in the art from consideration of the specification and practice of embodiments of the disclosure. Furthermore, certain terminology has been used for the purposes of descriptive clarity, and not to limit the disclosed embodiments of the disclosure. The embodiments and features described above should be considered exemplary.

We claim:

1. A probe device comprising:
at least one link processor and a correlation processor connected thereto,
wherein each of the at least one link processor includes two buffers, and each of the at least one link processor receives a plurality of packets from a plurality of directional traffic flows, generates information of a plurality of bi-directional traffic flows based on the received plurality of packets, stores the generated information in one of the two buffers within a reporting period, and reports the generated information stored in the one of the two buffers to the correlation processor when a boundary of the reporting period is reached,
wherein the generated information of each of the bi-directional traffic flows includes identification information extracted from the plurality of received packets from the plurality of directional traffic flows, and statistic data accumulated based on the plurality of received packets related to the each of the bi-directional traffic flows,
wherein the correlation processor calculates the statistic data of a particular group of traffic flows associated with a predetermined characteristic, based on the reported generated information of the each of the bi-directional traffic flows corresponding to the particular group of traffic flows,
wherein the other of the two buffers stores second generated information of the plurality of bi-directional traffic flows which is generated within a next reporting period and reports the stored second generated information in the other of the two buffers to the correlation processor when a boundary of the next reporting period is reached,
wherein the statistic data of the each of the bi-directional traffic flow comprises a number of bytes in the received packets or a number of received packets in the each of the bi-directional traffic flows, and a number of active seconds for the each of the bi-directional traffic flows within the reporting period,
wherein each of the at least one link processor reports the generated information for the each of the bi-directional traffic flows in a preconfigured data structure to the correlation processor,
wherein the reporting period is divided into a plurality of sampling periods,
wherein the preconfigured data structure for each bi-directional traffic flow comprises:
two first vectors, which respectively accumulate the number of bytes in the plurality of received packets or the number of received packets of two directional traffic flows corresponding to the each of the bi-directional traffic flow within the reporting period, wherein each of the first vectors has a plurality of elements, each element accumulates the number of bytes in the received packets or the number of received packets of the corresponding directional traffic flow within a sampling period of the plurality of sampling periods, and
two second vectors, which respectively record the number of active seconds of the two directional traffic flows corresponding to the each bi-directional traffic flow within the reporting period, wherein each of the second vectors has the plurality of elements, the each element records the number of active seconds of the corresponding directional traffic flow within a predetermined sub-sampling period.

2. The probe device as claimed in claim 1, wherein the each link processor comprises:
a processor unit;
a storage unit comprising the two buffers, wherein the storage unit is connected to the processor unit;
at least one input network interface, connected to a data network and the processor unit; and
an output interface, connected to the processor unit and the correlation processor,
wherein the processor unit receives the packets through the at least one input network interface, extracts the identification information from the received packets related to each bi-directional traffic flow, accumulates statistic data based on the received packets related to the each of the bi-directional traffic flows to generate information of the bi-directional traffic flows based on the received packets, and stores the generated information in the one of the two buffers and reports the stored information in the one of the two buffers to the correlation processor through the output interface when the boundary of the reporting period is reached, and
wherein the processor unit further stores information of bi-directional traffic flows which is to be generated in the next reporting period in the other of the two buffers and reports the stored information in the other of the two buffers to the correlation processor through the output interface when the boundary of the next reporting period is reached.

3. The probe device as claimed in claim 2, wherein the storage unit further comprises a memory unit to accumulate the number of bytes in the received packets for the each of the bi-directional traffic flows during the entire life of the each of the bi-directional traffic flows.

4. The probe device as claimed in claim 2, wherein the correlation processor comprises:
an input interface, connected to the at least one link processor;
a processor unit, connected to the input interface;
a storage unit, connected to the processor unit; and
an output interface, connected to the processor unit,
wherein the processor unit receives the reported information of bi-directional traffic flows from the at least one link processor through the input interface, calculates statistic data of the particular group of traffic flows associated with the predetermined characteristic, based on the reported information of bi-directional traffic flows corresponding to the particular group of traffic flows, and reports the calculated statistic data to a Customer Experience Management system, external to the probe device.

5. The probe device as claimed in claim 4, wherein the correlation processor calculates statistics of the particular group of traffic flows selected from the group consisting of:
all traffic flows for a particular subscriber associated with a predetermined subscriber identifier,
all traffic flows for a particular application protocol associated with a predetermined application identifier,
all traffic flows for a particular website associated with a predetermined domain name, and
all traffic flows for a particular application protocol type associated with a predetermined application identifier and for a particular subscriber with a predetermined subscriber identifier.

6. The probe device as claimed in claim 1, wherein when the probe device comprises a plurality of link processors, all of the link processors synchronize boundaries of each reporting period.

7. The probe device as claimed in claim 1, wherein the predetermined sub-sampling period is no longer than the predetermined sampling period.

8. The probe device as claimed in claim 1, wherein each of the at least one link processor further extracts a sequence number from each of the received packets related to the bi-directional traffic flows to determine whether there is an out of sequence packet, missing packet and/or duplication packet.

9. A method for calculating statistic data of traffic flows in a data network, comprising:
receiving a plurality of packets from a plurality of directional traffic flows in the data network through at least one link processor of a probe device;
generating, within a reporting period, in each of the at least one link processor having two buffers, information of a plurality of bi-directional traffic flows based on the plurality of received packets within the reporting period and storing the generated information in one of the two buffers,
reporting the generated information of the plurality of bi-directional traffic flows stored in the one of the two buffers to a correlation processor of the probe device when a boundary of the reporting period is reached,
wherein the generated information of each of the bi-directional traffic flows includes identification information extracted from the plurality of received packets from the plurality of directional traffic flows and statistic data accumulated based on the plurality of received packets related to the each of the bi-directional traffic flows;

in the correlation processor, calculating the statistic data of a particular group of traffic flows associated with a predetermined characteristic, based on the generated information reported by the at least one link processor; and
generating, within a next reporting period, in each of the at least one link processor, second information of the plurality of bi-directional traffic flows based on the plurality of received packets within the next reporting period and storing the second generated information in the other of the two buffers,
reporting the second generated information stored in the other of the two buffers to the correlation processor when a boundary of the next reporting period is reached,
wherein the statistic data of the each of the bi-directional traffic flows includes a number of bytes in the received packets or a number of received packets in the each of the bi-directional traffic flows within the reporting period, and the number of active seconds for the each of the bi-directional traffic flows within the reporting period, wherein the generated information of the plurality of bi-directional traffic flows based on the plurality of received packets comprises:
constructing a preconfigured data structure for each of the bi-directional traffic flows in the two buffers in each of the at least one link processor; and
storing in each data structure the identification information of the corresponding bi-directional traffic flow extracted from the plurality of received packets in the corresponding bi-directional traffic flow and the statistic data of the corresponding bi-directional traffic flow accumulated based on the received packets in the corresponding bi-directional traffic flow,
wherein each reporting period is divided into a plurality of sampling periods, each data structure includes two first vectors and two second vectors, wherein the storing of the statistic data of each bi-directional traffic flow in the data structure comprises:
accumulating the number of bytes in the received packets or the number of received packets in each of the bi-directional traffic flows within the each reporting period in two first vectors of the data structure, each of the first vectors corresponding to one of the two directional traffic flows in the bi-directional traffic flow, wherein each of the first vectors has a plurality of elements, each element for accumulating the number of bytes in the received packets or the number of received packets of the corresponding directional traffic flow within a sampling period of the plurality of sampling periods; and
recording the number of active seconds of the two directional traffic flows corresponding to the each of the bi-directional traffic flows within the each reporting period in the two second vectors, each of the second vectors for one of the two directional traffic flows in the bi-directional traffic flow, wherein each of the second vectors has the plurality of elements, the each element for recording the number of active seconds of the corresponding one of the two directional traffic flows within a predetermined sub-sampling period.

10. The method as claimed in claim 9, wherein for the condition where the probe device includes more than one link processor, the method further comprises:
synchronizing boundaries of the each reporting period of a plurality of link processors provided in the probe device.

11. The method as claimed in claim 9, wherein the calculating statistic data of the particular group of traffic flows associated with a predetermined characteristic comprises:

identifying the reported data structures of the bi-directional traffic flows related to the particular group of traffic flow based on the predetermined characteristic of the particular group of traffic flow;

applying logical OR on each element of all second vectors of the identified reported data structures to obtain a total number of active seconds of the particular group of traffic flows within the reporting period;

summing up the number of bytes in each element of all the first vectors of the identified reported data structures to obtain a total number of bytes in the received packets related to the particular group of traffic flows within the reporting period; and dividing the total number of bytes in the received packets by the total number of active seconds to obtain the Average Active Bit Rate of the reporting period of the particular group of traffic flows.

12. The method as claimed in claim 9, wherein the calculating statistic data of the particular group of traffic flows with a predetermined characteristic comprises:

identifying the reported data structures of bi-directional traffic flows related to the particular group of traffic flow based on the predetermined characteristic of the particular group of traffic flow;

applying logical OR on each element of all of the second vectors of the identified data structures to obtain the number of active seconds of the particular group of traffic flows within each sub-sampling period;

calculating a total number of active seconds in each sampling period based on the number of active seconds within each sub-sampling period;

summing up the number of bytes in each element of all first vectors of the identified data structures to obtain a total number of bytes in the received packets related to the particular group of traffic flows within each sampling period;

dividing the total number of bytes in the received packets in the each sampling period by the total number of active seconds in the each sampling period to obtain a Bit Rate of the particular group of traffic flows in each sampling period;

comparing the Bit Rate in the each sampling period to obtain a Peak Bit Rate of the particular group of traffic flows.

13. The method as claimed in claim 9, wherein the particular group of traffic flows associated with a predetermined characteristic is selected from a group consisting of:

all traffic flows for a particular subscriber associated with a predetermined subscriber identifier, all traffic flows for a particular application protocol with a predetermined Application ID, all traffic flows for a particular website with a predetermined domain name, and all traffic flows for a particular application protocol type with a predetermined application identifier and for a particular subscriber with a predetermined subscriber identifier.

14. The method as claimed in claim 13, wherein the predetermined subscriber identifier is Fully Qualified Tunnel End Identifier (FTEID) or International Mobile Subscriber Identity (IMSI) or Globally Unique Temporary ID (GUTI).

15. The method as claimed in claim 9, further comprising:

in each of the at least one link processor, extracting a sequence number from each of received packets in the bi-directional traffic flows to determine whether there is an out of sequence packet, missing packet or duplication packet.

* * * * *